W. J. WINDISCH.
JOURNAL BEARING.
APPLICATION FILED APR. 6, 1914.
1,118,457. Patented Nov. 24, 1914.
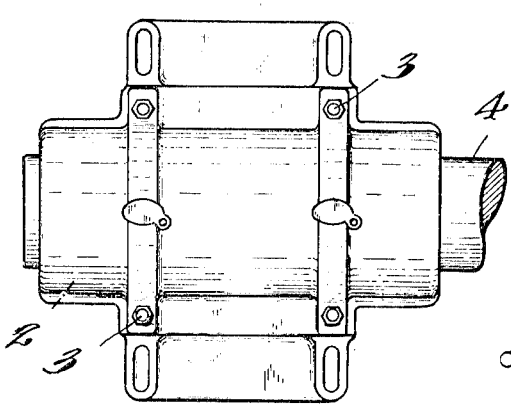
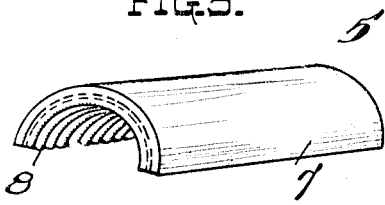
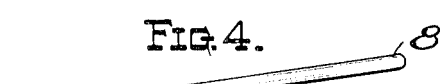
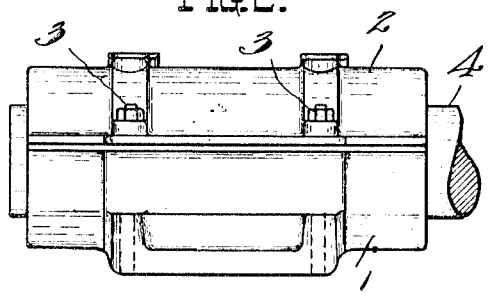
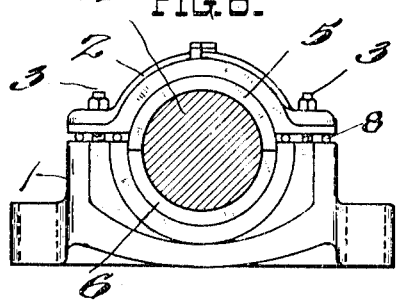
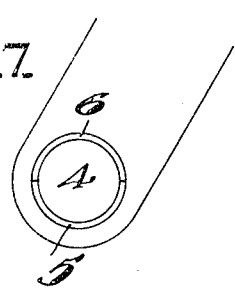
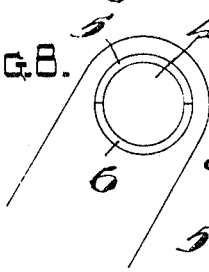
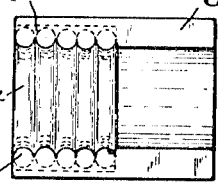
WITNESSES:
WILLIAM J. WINDISCH.
INVENTOR.
BY
ATTORNEY.

UNITED STATES PATENT OFFICE.

WILLIAM J. WINDISCH, OF NORTH BRADDOCK, PENNSYLVANIA.

JOURNAL-BEARING.

1,118,457.  Specification of Letters Patent.  Patented Nov. 24, 1914.

Application filed April 6, 1914. Serial No. 829,882.

*To all whom it may concern:*

Be it known that I, WILLIAM J. WINDISCH, a citizen of the United States of America, residing at North Braddock, in the county of Allegheny and State of Pennsylvania, have invented certain new and useful Improvements in Journal-Bearings, of which the following is a specification.

The present invention relates to improvements in journal bearings, and especially to the nature of the metallic linings of the bearings.

The primary object of the invention is the provision of metallic linings which will reduce the friction and consequent overheating of the journals and boxes in high speed engines or motors, and the invention consists essentially in utilizing a sectional lining for the bearing possessing different degrees of hardness and locating the harder or comparatively unyielding metal in position to receive the load of the bearing while the softer or comparatively yielding metal of the bearing lining is located on the opposite side of the journal from the load.

In actual practice I have found that the two metals best suited for the purpose are Babbitt metal as the comparatively unyielding metal and plumber's solder as the softer and more yielding metal, but it will be readily understood that other metals or alloys may be utilized, the essential feature of the invention being that a metal or alloy of softer or more pliable nature be used opposite the bearing metal of the lining which is receiving the load of the bearing.

In the accompanying drawings I have illustrated one complete example and a modification thereof, of the physical embodiment of my invention constructed according to the best modes I have so far devised for the practical application of the principles of my invention.

In the drawings: Figure 1 is a top plan view of a journal bearing embodying the novel features of my invention. Fig. 2 is a side elevation thereof. Fig. 3 is a perspective view of one of the sections of the bearing linings possessing the characteristics of softness and pliability, as plumber's solder. Fig. 4 is a perspective view of a bar of solder used in connection with other bars of a similar nature and soldered or cemented to a sheet of solder as shown in Fig. 3. Fig. 5 is a perspective view of a spacing plate or strip in common use between the cap and base of the journal block, which is eliminated by the bar of Fig. 4 which I substitute therefor. Fig. 6 is an end view of the journal box showing the journal in section. Fig. 7 shows in a diagrammatic way a journal with its load bearing upon the upper half thereof. Fig. 8 shows a similar view with the load bearing upon the lower half or section of the bearing lining. Fig. 9 shows a sectional lining that is reversible, and possesses both a Babbitt metal surface and a solder surface especially adapted for certain uses as will be described.

I have utilized a journal box of conventional type, to illustrate the application of the principles of my invention, comprising the block 1 and cap 2 which are held together by means of the bolts 3 as usual, and the journal 4 which is supported therein is lubricated by oil as in many instances.

As before stated the bearing plates or linings for the journal are sectional, and I have illustrated two semi-circular linings or sections 5 and 6. The lining 5 is of a soft, pliable, nature of the consistency of plumber's solder which in standard practice is composed of lead and tin in suitable parts and sometimes bismuth may be added. This lining encircles the half of the journal opposite the lining 6 and the latter lining is always in position to receive the load which the journal is bearing. The lining section 6 is of Babbitt metal of standard make comprising an alloy of copper, zinc and tin in predetermined proportions and is comparatively harder and less yielding than the solder which comprises the opposite lining section.

The soft lining 5 is preferably made up of a thin outer sheet 7 of solder, and a series of bars 8 arranged circumferentially in close contact with each other and extending from edge to edge of the plate or sheet 7, and the interstices between these rounded bars are filled in with melted or liquid solder which is poured in through an opening after the ends of the interstices have been plugged up with putty. In this manner the sheet and its bars are converted into a homogeneous body by the melted solder which cements the bars to the sheet.

In Fig. 6 the bars 8 are employed as spacers between the cap and block of the journal box, supplanting the metallic strip 8' of Fig. 5.

In Fig. 9 a reversible or duplex lining is illustrated which has one end of Babbitt metal as 6' and the other end provided with a facing of solder bars 8ª while the interstices between the bars and metal are filled in with cementing solder as 10. This form of the invention is particularly applicable for use in connection with high speed motors or engines of the aeroplane or flying machine type, but of course may be used with other motors. In these specified motors however the load is frequently shifted from one point of the bearing to an opposite point and to compensate for this change, when the duplex lining is used a Babbitt section as 6' faces an oppositely arranged solder section 10 in each instance so that the bearing linings of different materials face each other. One of the consequent advantages of this sectional lining is that the high priced resinous oils for lubrication may be dispensed with, and common machine oil may be employed even on the delicate high speed motors.

It will be understood that the soft solder lining receives the lesser pressure, and the less yielding Babbitt lining receives the greater pressure or load of the bearing on the journal. In actual practice the sectional bearings of this type of Babbitt metal and solder have been used on journals where 4500 revolutions per minute have been attained, and the resulting friction has not been sufficient to create a hot box, and the bearing has never "stalled." This "stalling" of the bearing is due to expansion of the lining under excessive heat from friction, and this expansion of the lining or bearing in many instances causes the engine to stop with disastrous results. The presence of the softer metal as solder as a portion of the lining of the bearing reduces the friction and consequently reduces the danger of heating the bearing. Another feature of the sectional journal constructed of these two metals, babbitt and solder, provides for compensation for wear in the journal box. Thus in Fig. 6 when the Babbitt metal 6 wears due to load thereon, the wear may be taken up by screwing down the cap 2, and inasmuch as the lining 5 is comparatively pliable, it is capable of adapting itself to compensate for the wear on the Babbitt lining. And in this connection the pliable strip or bar 8 may also be compressed to take up wear between the cap and block as will be understood.

In many instances, the existing journal bearings may be made practically new by displacing one of the original Babbitt linings which has become worn. A new solder lining may be substituted for the displaced lining, and in this case the pliability of the solder renders the new lining useful in overcoming any unevenness or irregularity in the bearing.

At present it is found necessary that the Babbitt metal linings of a bearing in aeroplane machinery be left comparatively loose in order to eliminate, to some extent the generation of friction and consequent heating of the bearing. While this loose bearing may be somewhat beneficial in reducing friction, it at the same time is detrimental to the operation of the shaft. By utilizing the linings herein described, the bearing fit may be tightened to overcome all looseness, and consequent wabbling or irregularities in the running of the shaft, and at the same time undue heating of the bearing and surrounding parts of the machinery is prevented because of the use of the solder lining which reduces the friction and heating, and the oil used as a lubricant is also retained within the bearing because of the close fit.

In using the bearing on aeroplane motors, the high priced resinous oils may be dispensed with, but the common machinery oil is not adapted for use at high altitudes as it clogs and freezes, and in order to eliminate both the high priced and low priced machinery oil I have discovered that animal oil, such as cod liver oil is particularly well adapted for an aeroplane motor lubricant. I find that this oil will not freeze at extremely low temperatures, nor will it gum or clog the shaft and bearings, and for this reason is especially well adapted for my bearing when used in aeroplane motors.

Having thus fully described my invention what I claim is:—

The combination in a journal box including a block and cap and securing means, of a pair of bearing plates each comprising a thin sheet and a series of circularly disposed round bars and solder fillings between said bars and sheet, one of said bearing plates having a wearing surface of a metal of sufficient hardness to bear the load of the journal, and the diametrically opposite plate having a surface made of a softer metal.

In testimony whereof I affix my signature in presence of two witnesses.

WILLIAM J. WINDISCH.

Witnesses:
 BEATRICE FITZ GERALD,
 W. A. HIRTLE.